June 27, 1967     J. D. MATTIMORE ETAL     3,328,053
INSULATED PIPE JOINT

Filed June 10, 1964     2 Sheets-Sheet 1

June 27, 1967 J. D. MATTIMORE ET AL 3,328,053
INSULATED PIPE JOINT
Filed June 10, 1964 2 Sheets-Sheet 2
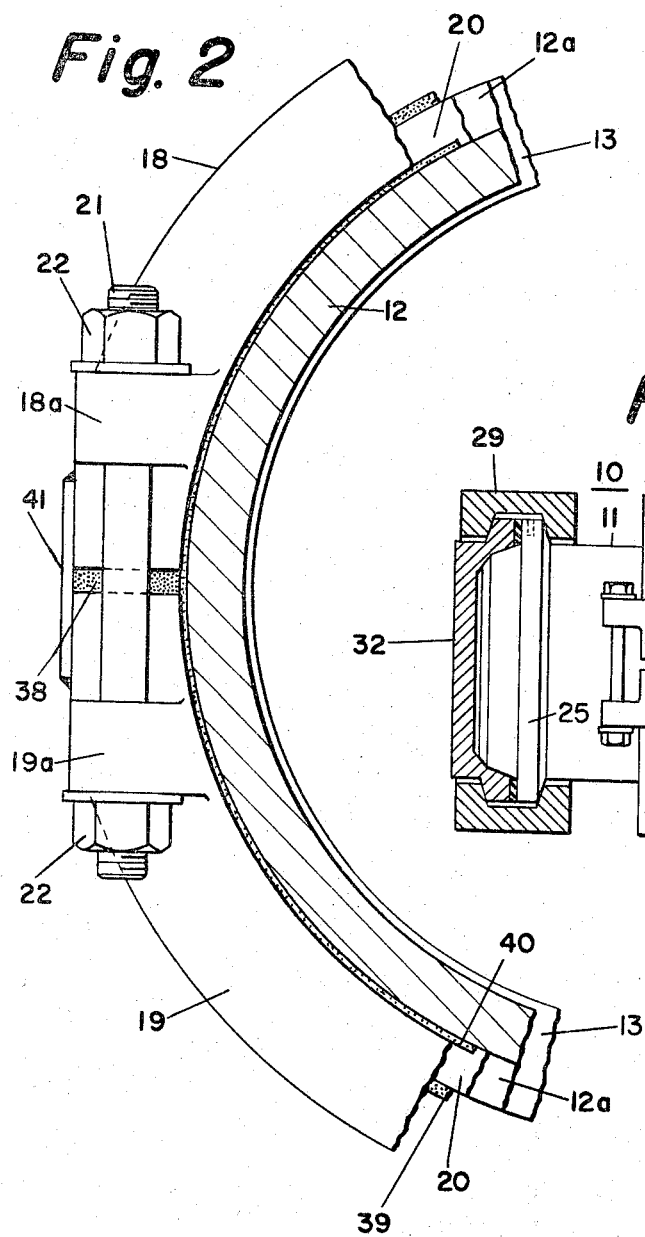

United States Patent Office 3,328,053
Patented June 27, 1967

3,328,053
INSULATED PIPE JOINT
John D. Mattimore and Arthur McCutchan, both of Louisville, Ky., assignors to Chemetron Corporation, Chicago, Ill., a corporation of Delaware
Filed June 10, 1964, Ser. No. 374,084
7 Claims. (Cl. 285—50)

This invention relates to improvements in insulated joints for underground piping, and has for an object the provision of a joint of rugged, simplified construction having high electrical insulating and fluid pressure withstanding properties, and which lends itself to complete factory assembly and testing and shipment ready for use.

Insulated joints for buried piping have long been used, and many designs are available to those skilled in the art. When metal piping is buried in the ground it is subject to corrosion due to earth currents and to "stray currents" from sources of electricity such as electrified surface transportation systems or manufacturing plants using direct current electricity. Direct current flowing in a pipe in a direction which supplies positive charges at the surface of the pipe results in the production of metallic atoms which break away from the surface in the form of ions. The resultant galvanic corrosion is frequently quite severe because of the large magnitudes of such earth currents and gives rise to costly repairs. Cathodic protection is frequently utilized to protect buried piping, particularly in areas subject to large earth currents. In order to localize the protection provided, it has been found desirable to isolate sections of the pipe line by providing insulated joints at the boundaries of the selected area where cathodic protection is to be applied.

High pressure piping, particularly as the pipe size increases, presents a difficult insulating problem. An insulating joint must not only provide electrical isolation between adjacent lengths of pipe or piping components, it must also provide a leak-proof seal against escape of the conducted fluid. To determine whether a joint is leak-proof requires testing at, or preferably above, the working pressures. With insulating joints of the conventional bolted flange type, such as heretofore most generally employed in high pressure pipe line work, such testing—whether at the factory or in the field—involves numerous difficulties and inconveniences as well as considerable expense, often running into many hundreds of dollars for the testing of a single insulating flange assembly in the relatively larger sizes. The conventional flanged insulating joint basically comprises two flanges of the welding neck type joined together by a relatively large number of bolts with an insulating gasket interposed between the mating surfaces of the flanges, and insulating sleeves and washers provided for electrical isolation of the bolts. In some cases a completely assembled joint of this type is installed directly into a pipe line by welding the ends of the welding neck flanges to the ends of the piping components to be connected. This, however, presents certain problems. The dielectric material employed for the gasket in such joints usually is such that it plastically deforms under the combined effect of heat in the order of 250° F. and the loading imposed upon it by the bolts to effect a seal. To prevent this happening, if "pups" are not used as described below, the welders are instructed to stop welding when the rim of the flange being welded becomes too hot to touch, and to allow the joint to cool. This obviously greatly increases the time for making the welds required to install the joint in the pipe line. Hence, in accordance with preferred practice, so-called "pups," i.e., pipe stub extensions, are welded to the necks of the flanges prior to bolting up the joint for the primary purpose of avoiding impairment of the insulating gasket and its sealing action when the complete assembly is later welded into the pipe line. Such pups, when used, often have a length approximating the diameter of the flanges, and sometimes more, and they serve to dissipate the heat of welding when the assembly is installed in a pipe line by welding the extremities of the pups to the ends of the pipes or other piping components to be joined.

For purposes of hydrostatically testing such insulating flange assemblies before their installation in a line, it is necessary to close off the ends, and this is done by welding heads or caps to the extremities of the pups, provision also being made for introducing fluid under pressure to the thus-closed assembly. An important disadvantage of this procedure is that, after the hydrostatic test is accomplished, the heads or caps must be cut off of the pups and the ends of the pups rebeveled for welding of the assembly into a pipe line. Due to the expense involved, it is unusual for a supplier of such flanged type insulating joints to be requested to hydrostatically test an assembly at the factory. For like reason, and also because of the time, labor and equipment required, relatively few pipe line companies perform such tests in the field. Rather, it is the general practice to defer hydrostatic testing until the insulating flange assemblies are actually installed in the pipe line in the ground and the system is subjected to pressure testing as a whole. When leaks or other defects then show up, it often is a costly and schedule-delaying task to correct them, perhaps even requiring digging out the joint and cutting it from the line in order that proper repairs may be accomplished.

For the reasons hereinbefore mentioned, there has been a long felt desire for an insulating joint that can be simply and economically pretested at the factory with assurance that it will maintain proper fluid pressure retention and electrical insulation properties when installed in a pipe line. The present invention provides such a joint which, of simple and relatively low cost construction, lends itself to economical pretesting at the factory; can be shipped as a unit and installed as desired in a piping system, and has other structural and operational advantages that will be brought out in the ensuing description.

In carrying out the invention in its preferred form, the insulated pipe joint comprises two pipe hubs each having a circumferential radially projecting flange at one end. The front faces of these flanges are flat, i.e., lie in radial planes perpendicular to the axis of the joint, and are secured in mating relationship by means of a segmental clamping yoke with a flat insulating gasket interposed between the mating front faces of the flanges and another flat insulating gasket interposed between the clamping yoke and the back face of one of the flanges. The said back face of the one flange is flat, i.e., extends in a radial plane, and the clamping yoke is provided with an internal groove for engaging the flanges of the pipe hubs, one wall of which groove is flat so that it extends parallel to the flat back face of the said one flange and bears against the second mentioned insulating gasket. With the flat gasket with its parallel planar sides between the parallel flat back face and the parallel flat face of the groove, there is provided protection against insulation damage to that gasket during joint tightening. The other flange has a tapered back face angularly inclined toward its flat front face; and the other wall of the groove in the clamping yoke likewise is inclined so as to be parallel to and bear against the tapered back face of said other flange. Bolts are provided for drawing the segments of the yoke assembly toward each other so as to clamp the flanges together and develop the required sealing forces on the gaskets, the construction and arrangement being such that a minimum of distortion is imposed on the two flat gaskets which are utilized to provide the electrical insulation and, at least in part, to provide the sealing means for the joint. If desired, and preferably, auxiliary gaskets of resiliently deformable material, such as conventional forms of O-rings, may be disposed in grooves in the flat front or mating surfaces of the flanges so as to bear against opposite sides of the interposed gasket and provide additional sealing action.

An additional feature of the invention includes supplemental flanges or collars, one of which is located near the pipe attachment end of each of the hubs, for cooperation with additional clamping yoke assemblies by means of which closure members may be applied to seal the open ends of the hubs for testing purposes. Thus the insulated pipe joint may be simply and economically sealed and hydrostatically tested by subjecting it to high fluid pressures either at the factory, or elsewhere, as may be most desirable or convenient. Also, provision is made for subjecting the assembled joint to high voltage to determine the electrical resistance across the joint.

For further objects and advantages of the invention and for a discussion of a preferred embodiment thereof, reference is to be had to the accompanying drawings in which:

FIG. 2 is a fractional sectional view taken along the line 2—2 of FIG. 1; and

FIG. 3 is a side view, partly in section of the joint of FIGS. 1 and 2, with closure members and securing yokes added.

Figure 1:
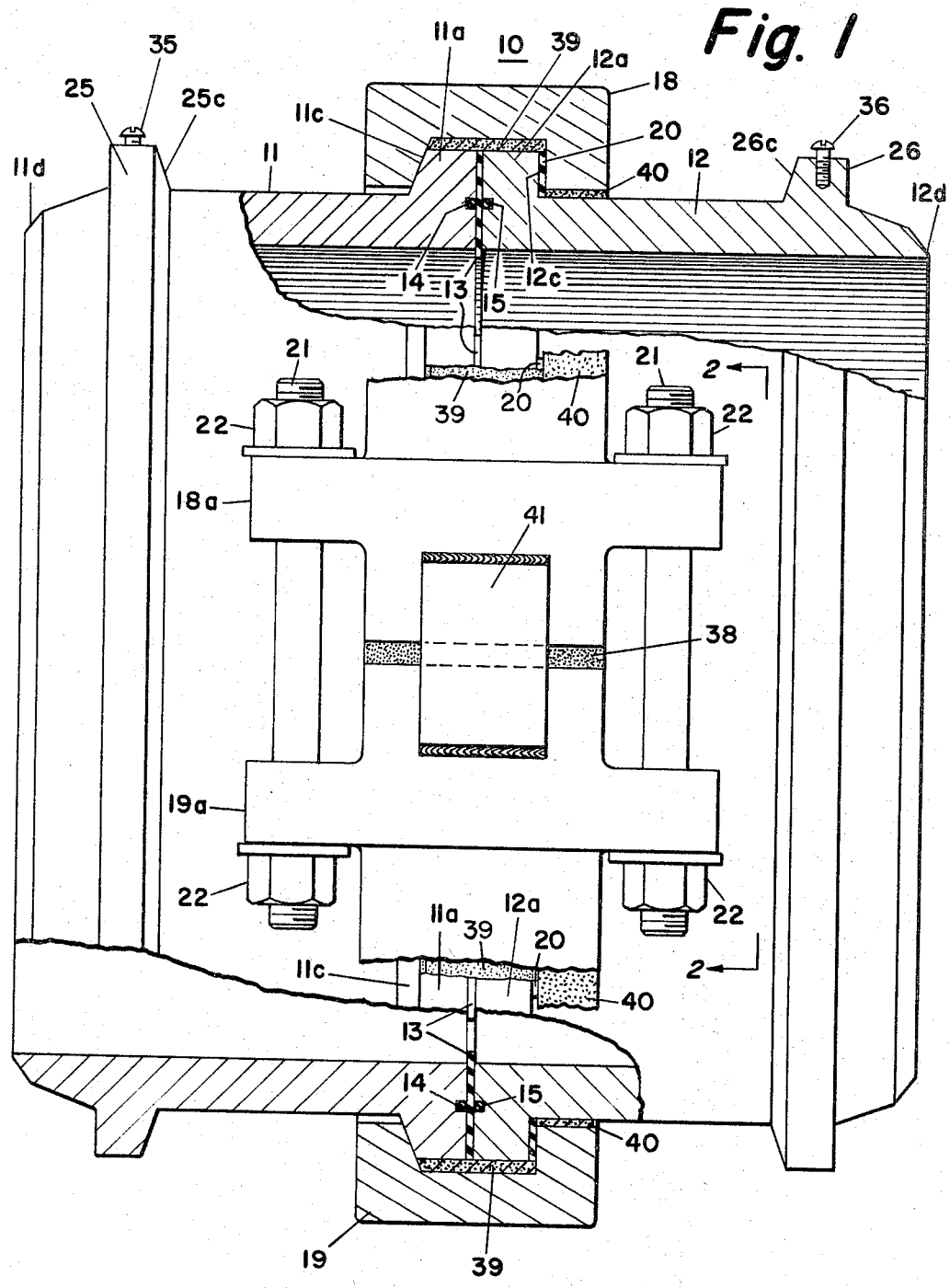
FIG. 1 is a side view partly in section of an insulating joint embodying the invention.

Referring now to FIG. 1, an insulated pipe joint 10 embodying the invention includes two pipe hubs 11 and 12 which at one end are provided with circumferential radially extending flanges 11a and 12a, respectively, such as are sometimes referred to as "laps" by those skilled in the piping art. These flanges have flat front faces, i.e., lying in planes normal to the axes of the hubs, which are adapted to mate with each other and have a centrally located flat insulating gasket 13 interposed therebetween. This gasket has a face area sufficient to cover the whole, or substantially the whole, of the flange front faces. On opposite sides of this gasket there may be provided O-rings 14 and 15, of suitable resiliently deformable material for additional sealing action, and which are disposed in grooves in the flat front faces of the flanges 11a and 12a. The back face 11c of flange 11a is inclined toward its flat front face at a suitable angle which, although not critical, nevertheless should be relatively small. For maximum clamping action by the yoke assembly hereinafter described, the angle of inclination, i.e., the angle of the face 11c with respect to a plane extending normal to the axis of the hub 11, should be substantially less than 45°, and preferably in the order of 10° to 20°, so that the major components of the clamping forces exerted by the yoke on the flanges 11a and 12a will be in an axial direction. This also has the effect of reducing to a small value the radial components of force tending to cause outward movement of the yoke segments when the joint is under pressure. In the particular embodiment illustrated, an angle of inclination of 20° is utilized effectively.

As an important feature of the invention, the back face 12c of the flange 12a, on the other hand, is flat; that is, it extends radially, or at 90°, from the outside surface of the hub 12. The reasons for and advantages of this feature will be described more in detail hereinafter. A second flat insulating gasket 20 is disposed in contact with and overlies the whole, or substantially the whole, of the extent of the flat back face 12c.

For securing the flanges of hubs 11 and 12 together and effecting the desired sealing of the joint between them, there is provided a segmental clamping yoke which extends substantially completely around the hubs and is comprised of two semi-circular segments or members 18 and 19. In the inner peripheries of these members there are formed grooves for receiving the flanges 11a and 12a, which grooves in effect constitute one substantially continuous groove, and the details of which grooves—of identical form in both yoke segments—will be apparent from FIG. 1. These grooves have an outer wall or base portion of semi-cylindrical form which overlies the outer peripheries of flanges 11a and 12a, and from which there extend inwardly two side walls adapted to bear respectively against the back faces of the hub flanges. One of these side walls is machined to provide a smooth frusto-conical surface which extends at the same angle of inclination as the back wall 11c and is adapted to bear directly against that back wall. The other side wall of the yoke segment grooves extends in parallel opposed relationship to the flat back wall 12c of flange 12a, i.e., lies in a plane normal to the axis of the hub, and bears against the insulating gasket 20. Yoke members 18 and 19 are connected by clamping screw bolts 21, 21 which extend between flanges on the yoke members as indicated at 18a and 19a on the drawings; it being understood that like flanges and bolts as shown in FIG. 2 are provided on the opposite side of the pipe hubs as viewed in FIG. 1, or on the right side of the pipe hubs as viewed in FIG. 2. Thus when the nuts 22, 22 on bolts 21, 21 are tightened on the diametrically opposite sides of the pipe hubs, the yoke segments or members 18 and 19 are drawn toward each other to clamp the hub flanges 11a and 12a together and effect a tight sealing of the joint therebetween. Extremely light sealing and clamping action may be effected due to the wedging action of the inclined walls of the yoke segment grooves against the inclined back face 11c of hub 11, thus exerting a high degree of pressure on gaskets 13 and 20.

Due to the disposition of gasket 20 between the flat back face 12c and the cooperating flat walls of the yoke segment grooves, in accordance with an important feature of the invention, the above described clamping movement of the yoke members causes little or no cutting or abrading of the gasket 20 since the direction of relative movement between the flat back surface of flange 12a and the cooperating walls of the yoke segment grooves is parallel to the surfaces of the gasket. Thus the cooperating surfaces are planar and parallel one to the other and all lie in radial planes perpendicular to the axis of the joint. It has been found by actual tests that the disposition of the gasket 20 between flat surfaces as above described affords important and unexpected advantages over disposition of the gasket against an inclined surface such as that of back face 11c. Among these advantages are the following: the gasket can remain flat and is not distorted into a conical shape when the yoke segments are assembled and drawn together; the corners of the yoke segments at the two splits in the yoke assembly have less tendency to dig into and tear the insulating gasket material; and the flat surfaces between which the gasket is disposed provide a more even bearing area at those corners as well as over the remainder of the surfaces of the gasket when the joint is assembled and tightened.

Since the purpose of the joint is primarily for high electrical insulation without presenting any fluid leakage problems, it will be understood, of course, that the gaskets 13 and 20 should be made of material having good electrical insulating properties. Those skilled in the art will understand that many insulating gaskets of differing material may be utilized depending upon the particular application in the sense of pressure, temperatures and the composition of the liquids or fluids to be conducted through the pipe joint. As an example of a preferred gasket, there have been utilized very effectively gaskets made of glass fibers with a phenolic binder. Gaskets of this kind are preferred since they exhibit a minimum of creep under pressure and have high heat resisting characteristics. They also provide the requisite insulating characteristics for the joint.

As previously has been mentioned, it is desirable to provide O-rings, as indicated at 14 and 15, on opposite sides and bearing against the central insulating gasket 13 for additional sealing against high fluid pressures. Such O-rings may be of any suitable kind such as generally employed in fluid sealing applications, which generally are comprised of synthetic rubber or other resiliently deformable material. In general, it is possible to obtain more effective sealing action with O-rings than with flat gaskets. In a joint such as that of the present invention, the use of the supplemental O-rings as illustrated is particularly desirable since gaskets of good electrical insulating properties, especially if made of a glass fiber-phenolic binder composition such as above mentioned, generally are relatively hard so that they do not have as effective sealing action as gasket materials commonly employed solely for fluid sealing applications.

As shown in FIGS. 1 and 2, and as thus far described, the insulating joint in use is welded between two lengths of pipe or other components forming part of a piping system. Thus the hubs 11 and 12 terminate in welding necks 11d and 12d, the ends of which are beveled as is conventional for welding purposes. With insulating joints of the bolted flange type employing conventional welding neck flanges, it is the general practice, as previously mentioned, to weld onto the ends of the flanges relatively long extensions or "pups" which serve to dissipate the heat of welding during field installation of the assembly in a pipe line, thereby to avoid impairment of the insulating gasket and its sealing function. In contrast, joints constructed in accordance with the present invention do not require the welding on of such pups, the integral hubs 11 and 12 themselves serving to dissipate welding heat while being considerably shorter than the overall length of flange plus pup in a conventional flanged insulating joint. Additionally, in accordance with an important feature of the invention, the hubs 11 and 12 are provided with heat-sinks in the form of integral auxiliary flanges or collars, as indicated at 25 and 26 respectively, which are located adjacent the outer or welding ends of the hubs. These auxiliary flanges increase the efficiency of welding heat dissipation, and make it possible to employ hubs of relatively short length. Thus, the overall length of a complete assembly may be much shorter than that of a conventional insulating flange assembly of the bolted type for a given size joint, resulting in substantial cost savings in construction and significant benefits from the standpoints of economy and ease of transportation to and installation at a pipe line location in the field.

As a further important feature of the invention, the auxiliary flanges 25 and 26 are adapted to serve as attachment means for closures employed for purposes of hydrostatic testing of complete joint assemblies. To this end they are provided with beveled surfaces 25c and 26c, respectively, inclined toward the extremities of the hubs at a suitable angle, in the range of about 10° to about 40° with respect to a radial plane normal to the axes of the hubs, which for convenience in machining may be the same as the angle of inclination of surface 11c. Thus, as illustrated in FIG. 3, closure members such as indicated at 32 and 33, respectively, and which may be in the form of caps, heads or blind flanges, may be readily applied to the ends of hubs 11 and 12. This may be accomplished by quick-detachable segmental bolted yokes, as indicated at 29 and 30, which may be of the same type as the main joint securing yoke 18, 19. Gaskets of suitable form and material may be interposed between the rims of the closures and the ends of the hubs so that, upon drawing up of the yokes 29 and 30, the ends of the joint assembly are tightly sealed.

As indicated at 34, one of the closure members 33, in the exemplary illustration of FIG. 3 may be provided with a pipe for admission of fluid to develop internal pressure for hydrostatically testing the joint assembly. Thus, by virtue of the supplemental flanges 25 and 26, it is possible to pretest a joint by subjecting it to hydrostatic test in such manner that the main clamping yoke holding the assembly together may be subjected to high hydrostatic end load while at the same time testing the sealing effectiveness of the combination of gaskets 13, 14 and 15. As an example of the severity of the tests to which the joints may be subjected, and actually are subjected in commercial practice, in the case of a 30 inch joint subjected to a hydrostatic test of 2,175 p.s.i., the longitudinal force on the clamping yoke would be approximately a million and a half pounds, or 750 tons, tending to pull the yoke segments apart. In actual practice, joints constructed in accordance with the present invention have been proven capable of withstanding internal pressures of as high as 3,000 p.s.i. in the case of a 30-inch joint and 5400 p.s.i. in the case of a 4-inch joint. With such factory pretesting, it is assured that the joints when finally installed in a pipeline will have adequate strength for specified high pressure working conditions.

In order also to permit ready pretesting of the electrical insulating characteristics of an assembled joint, hubs 11 and 12 are provided with terminal connections 35 and 36, respectively, in the form of screws received in threaded openings in the auxiliary flanges 25 and 26. These may be utilized during the testing operation to apply high voltage to the assembly, a common requirement being that the joint must show infinite resistance on the 25 meg-ohm scale when impressed with 1000 volts D.C. The terminal connections also provide for attachment of lightning arresters or similar devices in the field. By the provision of such screw type connections, there is avoided the possibility of underbead cracking which can occur when lead wires are welded to the pipe in accordance with heretofore common practice.

As a further important feature of the invention in its preferred embodiment, an insulating filler material 39 is injected or otherwise applied in all voids or spaces where there may be any possibility of arcing or electric leakage between adjacent parts which may have different electric potential, such as the void between the inner face of the clamping ring grooves and the outer faces of the flanges 11a and 12a, and also the filler material 40 in the annular space between the skirts of the yoke segments and the outer surface of hub 12 adjacent gasket 20. Additionally, as an extra precaution against entrance of moisture into the joint, the spaces between the ends of the yoke segments may be filled with similar insulating material as indicated at 38, FIG. 1, and such material also may be applied in the annular space between the yoke segment skirts and hub 11, i.e., on the opposite side of flanges 11a and 12a from the gasket 20. Epoxy resin compound has been found to be very effective for such filler material. Whether the filler material be used or not, the structure, its dimensioning and the described cooperative relationship provide the needed means to maintain the insulated spaced relationships of the groove base and of the inner face with the pipe hub 12.

As a further precaution against electric leakage across the joint due to possible moisture, the accidental presence of metal particles or other causes, it is preferable before assembling the joint to apply a coating of epoxy resin paint or other suitable insulating material to all surfaces of hubs 11 and 12, their flanges 11a and 12a, and the inner surfaces of the yoke segments 18 and 19, which will be in juxtaposition in the final assembled condition of the joint.

An important advantage of insulating joints of the present invention is that they may be delivered to a job site as complete units—factory-assembled, factory-tested and ready for welding into the line. There are no parts to be lost or broken and there is no problem in attaining a leakproof joint or assuring effective electric insulation, such as presents a particularly difficult job in inclement weather with conventional joints of the kind heretofore employed. Further, insulated joints of the present invention do not require maintenance, or even a retightening of bolts after being welded into the line, which latter is an important but often overlooked procedure that should be carried out with each individual installation of conventional flanged insulating joint assemblies. Joints of the present invention, after their factory assembly and pretesting, preferably and usually are provided at the factory with metal plates or strips, as indicated at 41, tack welded across each of the "splits" in the clamping yoke to seal the joint and discourage accidental disassembly in the field.

It is to be understood, of course, that various modifications may be made in the illustrated construction without departing from the invention and that some features of the invention may be eliminated if their attendant benefits are not required. For example, where severe pretesting involving subjection of a joint to high hydrostatic end loads, as above described, is not required, the supplemental laps 25 and 26 may be eliminated. In such cases the joints still may be, and actually are in practice, tested to assure that they are adequately strong from an internal pressure standpoint. This involves simply the fittting of self-restrained end plugs to the ends of the hubs and subjecting the joint merely to a "leak test" to determine whether the seals hold the internal pressure. Elimination of the auxiliary laps, however, results in sacirfice of their previously described beneficial heat-sink action.

We claim:

1. An insulated pipe joint, comprising
two pipe hubs each having a circumferential flange adjacent one end and disposed in end-to-end relationship with the front faces of the flanges mutually confronting each other,
one of said flanges having a flat back face lying in a plane substantially normal to the axis of its associated hub and the other of the flanges having a tapered back face angularly inclined toward its front face,
a first insulating gasket disposed between the confronting front faces of the flanges,
a second insulating gasket having opposite sides parallel and substantially planar, one of said opposite sides bearing against and substantially coextensive with said flat back face,
a ring-like clamping yoke encircling the flanges to secure said hubs together,
said yoke comprising a plurality of separable arcuate segments, and
adjustably tightenable fastening means extending between adjacent ends of adjacent segments for connecting said hubs in end-to-end relationship,
the inner faces of said segments being formed to provide a substantially continuous inwardly facing circumferential groove receiving therein the outer peripheries of said flanges,
one side wall of said groove extending substantially parallel to said flat back face of said one flange and in pressure contact with the other of said opposite sides of said second gasket to provide for movement of that side wall parallel to said other side of said second gasket to minimize injury to it during said movement,
the other side wall of said groove being inclined so as to extend substantially parallel to and in encircling contact with said tapered back face of said other flange for development of joint sealing forces on said gaskets upon tightening of said fastening means,
the base of said groove being in insulated spaced relation to said one flange and
the inner face of the clamping yoke being in insulated spaced relation to the pipe hub with which said one flange is associated, and means to maintain said insulated, spaced relationships of said groove base and of said inner face.

2. An insulated pipe joint comprising
(1) two pipe hubs, each adapted at one end to be welded to an end of one of two piping components to be connected in a pipe line, and each hub having at its other end a circumferential radially projecting flange,
  (a) each of which flanges has a flat front face adapted to mate with the like flat front face on the other of the flanges,
  (b) one of said flanges also having a flat back face, and
  (c) the other of said flanges being tapered in a radial direction so as to have a back face which is inclined toward its flat front face;
(2) an adjustable clamping yoke comprising a plurality of separable arcuate segments in end-to-end relationship encircling said flanges for securing them together with said flat front faces in opposed face-to-face relationship, and tightenable fastening means associated with adjacent ends of said segments for tightening said yoke,
  (a) said yoke having in its inner periphery a groove which receives said flanges,
    (i) one side wall of which groove is flat so that it extends in substantially parallel opposing relation to said flat back face of said one flange,
    (ii) the other side wall of which groove is inclined so that it extends in substantially parallel opposing relation to said inclined back face of said other flange and is operative to exert wedging action to draw the flanges toward each other when the clamping yoke is tightened;
(3) a first annular flat insulating gasket interposed between said flat front faces and having a face area sufficient to cover substantially the whole of said front faces;
(4) a second annular flat insulating gasket interposed between the flat back face of said one flange and said opposed flat side wall of the yoke groove and having a face area sufficient to cover substantially the whole of said flat back face;
(5) a pair of supplemental sealing gaskets of resiliently deformable material, each disposed in an annular groove in the flat front face of a respective one of said flanges so that said supplemental gaskets bear respectively against opposite sides of said first mentioned insulating gasket;
(6) a filler of electrical insulating material disposed in at least all those voids and spaces of the assembled joint which are between or adjacent to parts of the joint that may have different electric potential when the joint is installed in a pipe line;
(7) a pair of axuiliary circumferential flanges, each integral with a respective one of said pipe hubs and located adjacent said one end of the hub opposite to said first mentioned flanges, operative as heat-sinks to dissipate heat of welding when the joint assembly is welded into a pipe line,
  (a) each of which auxiliary flanges also is formed and arranged to be engaged by a quick-detachable adjustable clamping yoke for securing a closure member in sealing relation to the end of its associated hub;
(8) and a pair of electrical terminal elements, one on each of said hubs, for the making of electrical connections thereto.

3. An insulated pipe joint comprising two pipe hubs each having a circumferential flange with a flat front face, one with a flat back face substantially normal to the axis of its hub and the other with a tapered back face angularly inclined toward its flat front face,
a flat insulating gasket disposed between said front faces for insulating said hubs one from the other,
a second flat insulating gasket substantially coextensive with said flat back face, a ring-like clamping yoke comprising a plurality of separable arcuate segments in end-to-end relationship encircling said flanges, tightenable fastening means operatively associated with the adjacent ends of said segments for tightening said yoke, said segments each having an arcuate groove within which said flanges project, one side wall of each said groove having an inclined arcuate surface complementary to said tapered back face for development of joint sealing forces upon said gaskets during said tightening of said yoke, the other opposing side wall of each groove having a flat surface complementary to said flat back face in pressure contact with said second insulating gasket, each said groove having a radial depth to provide an electrical insulating space between each said segment and the adjacent outer periphery of at least said hub flange which has said flat back face, electrical insulating material filling said last-named space and between the end-portions of said segments, each said segment having an inner face opposite the outer surface of the said hub which has the flange with said flat back face and spaced therefrom to provide an insulating space, and electrical insulating material filling said last-named space.

4. The insulated pipe joint of claim 3 in which a metal plate or strip bridges the joint between adjacent ends of said segments of the clamping yoke and is rigidly secured to the segments to discourage disassembly of the joint.

5. The insulated pipe joint as defined in claim 3, adapted to be welded into a pipe line and having also a pair of auxiliary circumferential flanges, each integral with a respective one of said pipe hubs and located adjacent the end of the hub opposite to said first mentioned flanges, operative as heat-sinks to dissipate heat of welding when the joint assembly is welded into a pipe line, each of which auxiliary flanges also is formed and arranged to be engaged by a quick-detachable adjustable clamping yoke for securing a closure member in sealing relation to the end of its associated hub.

6. The pipe joint of claim 5, in which clamping yokes engage said auxiliary flanges to hold closure members in sealing relation to said hubs.

7. The insulated pipe joint of claim 3 in which additional flanges are provided, one at each extremity of said joint, each said flange having a flat front surface and an inclined back surface for receiving yokes for clamping closure members to the ends of said joint for pressure testing of said joint, said additional flanges serving as heat-sinks during welding of said joint into a pipe line and thus providing for decreased heating of said gaskets.

References Cited

UNITED STATES PATENTS

| | | | |
|---|---|---|---|
| 514,822 | 2/1894 | Gennert | 285—50 |
| 2,752,579 | 6/1956 | Caldwell | 285—48 |
| 2,984,899 | 5/1961 | Richter | 285—286 |
| 3,204,989 | 9/1965 | Wilson | 285—50 |
| 3,213,187 | 10/1965 | Kish | 285—369 |

FOREIGN PATENTS

| | | |
|---|---|---|
| 69,075 | 10/1941 | Czechoslovakia. |
| 739,400 | 9/1943 | Germany. |
| 842,233 | 7/1960 | Great Britain. |
| 493,585 | 4/1954 | Italy. |

CARL W. TOMLIN, *Primary Examiner.*

D. W. AROLA, R. GIANGIORGI, *Assistant Examiners.*

UNITED STATES PATENT OFFICE
CERTIFICATE OF CORRECTION

Patent No. 3,328,053            June 27, 1967

John D. Mattimore et al.

It is hereby certified that error appears in the above numbered patent requiring correction and that the said Letters Patent should read as corrected below.

Column 4, line 27, for "light" read -- tight --.

Signed and sealed this 4th day of March 1969.

(SEAL)
Attest:

Edward M. Fletcher, Jr.            EDWARD J. BRENNER
Attesting Officer            Commissioner of Patents